United States Patent [19]

Teraoka et al.

[11] Patent Number: 4,895,938
[45] Date of Patent: Jan. 23, 1990

[54] PROCESS FOR SEPARATING POLYSACCHARIDES FROM TAMARIND SEEDS

[75] Inventors: Takashi Teraoka, Kishiwada; Akira Iriguchi; Kenji Ebie, both of Kawanishi; Namio Mizuhashi, Takarazuka, all of Japan

[73] Assignee: Shikibo Limited, Osaka, Japan

[21] Appl. No.: 208,623

[22] Filed: Jun. 20, 1988

[30] Foreign Application Priority Data

Jul. 16, 1987 [JP] Japan .................. 62-178122

[51] Int. Cl.$^4$ .................................. C08G 8/02
[52] U.S. Cl. ................................... 536/128
[58] Field of Search ........................ 536/128

[56] References Cited

U.S. PATENT DOCUMENTS

| | | | |
|---|---|---|---|
| 3,287,350 | 11/1966 | Deguchi et al. | 536/128 |
| 3,309,355 | 3/1967 | Heritage et al. | 536/128 |
| 3,309,356 | 3/1967 | Esterer et al. | 536/128 |
| 3,399,189 | 8/1968 | Gordon et al. | 536/128 |
| 3,883,505 | 5/1975 | Hamuro | 536/128 |
| 4,074,043 | 2/1978 | Jones et al. | 536/128 |

Primary Examiner—John W. Rollins
Assistant Examiner—Pamela S. Webber
Attorney, Agent, or Firm—Armstrong, Nikaido, Marmelstein, Kubovcik & Murray

[57] ABSTRACT

A method for separating polysaccharides from tamarind seeds, comprising:

(1) pulverizing the tamarind seeds to form particles of less than 80 microns;
(2) dispersing the particles in an aqueous medium consisting essentially of water and 5-60% by weight of at least one water soluble organic solvent;
(3) classifying the dispersion in a hydrocyclone, whereby the particles of polysaccharides descend to the bottom of the hydrocyclone, from which they are discharged; and whereby particles of other components, in particular proteins, simultaneously rise to the top of the hydrocyclone, from which they are discharged.

8 Claims, 2 Drawing Sheets

PROCESS FOR SEPARATING POLYSACCHARIDES FROM TAMARIND SEEDS

BACKGROUND OF THE INVENTION

This invention relates to a process for separating polysaccharides from tamarind seeds. More particularly, this invention relates to a process for producing commercially from tamarind seeds a high grade of powdered polysaccharides at low cost and by simple operations.

Tamarind seeds are seeds of a tall tree, *Tamarindus indica*, which grows in the tropics. In general, the tamarind seeds contain only 45–55% by weight of polysaccharides, which are intricately mixed with other ingredients such as proteins and fats, so that the polysaccharides in the tamarind seeds are notably difficult to separate. The polysaccharides are generally contained in a seed portion called the albumen, which can be separated without difficulty from the rest of the seed. However, tamarind seeds differ from other seeds, such as locust bean seeds and guar seeds, in that the albumen also contains proteins even after it is divided into fine particles. Thus the separation of the polysaccharides from the tamarind seeds is more difficult than in other seeds, and requires special means.

On the other hand, the polysaccharides obtained from tamarind seeds have good properties which polysaccharides from other sources do not have. For example, the polysaccharides from tamarind seeds are stable against acids, and are widely used as a thickening agent or a gelling agent in the food, paper and fiber industries. If polysaccharides which are used in these fields contain proteins and fats as impurities, these polysaccharides would form an aqueous solution which is liable to generate foams, to lose fluidity, or to form deposits. Thus polysaccharides from tamarind seeds are considered to be of low quality for this reason. Accordingly, in order to obtain polysaccharides of a high quality from tamarind seeds, it is necessary to purify the thus obtained polysaccharides to remove proteins and fats therefrom as much as possible.

Various attempts have been made to remove proteins and fats from polysaccharides obtained from tamarind seeds. All these attempts include the steps of first pulverizing the tamarind seeds to form powders, and then treating the powders with air, water, or an organic solvent. All these methods, however, require many complicated steps as described below, and hence are unsatisfactory.

Japanese Unexamined Patent Publication No. 52-111597, which corresponds to U.S. Pat. No. 4,074,043, discloses a method wherein the tamarind seeds are first pulverized to form powders of a particle size of less than 100 microns, then the powders are separated by air classification into a fraction rich in proteins and a fraction rich in polysaccharides. However, in order to carry out this separation effectively, it is necessary to remove fats beforehand by treating the powders with an organic solvent, which makes the process intricate and troublesome. If the fats are not removed, the powders become tacky and are difficult to disperse in air.

Japanese Examined Patent Publication No. 40-18120 discloses a method wherein the tamarind seeds are first subjected to extraction by hot water, and the resulting extract is coagulated by an inorganic sulfate. However, this process has disadvantages in that it is complicated, the cost of the extraction by use of hot water is high, the yield is poor, particularly in view of the high cost, and it is difficult to remove completely the salts which have been added for the coagulation step.

Japanese Examined Patent Publication No. 42-14034 discloses a method wherein tamarind seed powders are dispersed in an organic solvent to form a dispersion, and the polysaccharide powders are recovered from an underlayer of this dispersion using the difference in density between the solvent and the powders. However, this process requires that the powders are washed beforehand with water, then filtered and dried. As a result, the process has the disadvantage of being complicated.

Japanese Unexamined Patent Publication No. 60-118152 discloses a method wherein the proteins in the tamarind seed powders are decomposed and solubilized by a proteic enzyme. However, if the tamarind seed powders are treated in accordance with the process taught in this publication, then fats cannot be removed from the polysaccharides. As a result, the polysaccharides tend to become swollen in hot water, which renders the subsequent steps of filtration and washing difficult As mentioned above, all the attempts hitherto made to obtain polysaccharides of a high grade from tamarind seeds were not satisfactory, required intricate steps, and therefore could not be advantageously carried out on a commercial scale.

SUMMARY OF THE INVENTION

An object of the present invention is to provide a process for obtaining a high grade of polysaccharides in good yield from tamarind seeds by simple operations. The polysaccharides obtained by the method of this invention have a very low content of impurities such as proteins and fats.

DETAILED DESCRIPTION OF INVENTION

Figure 1:
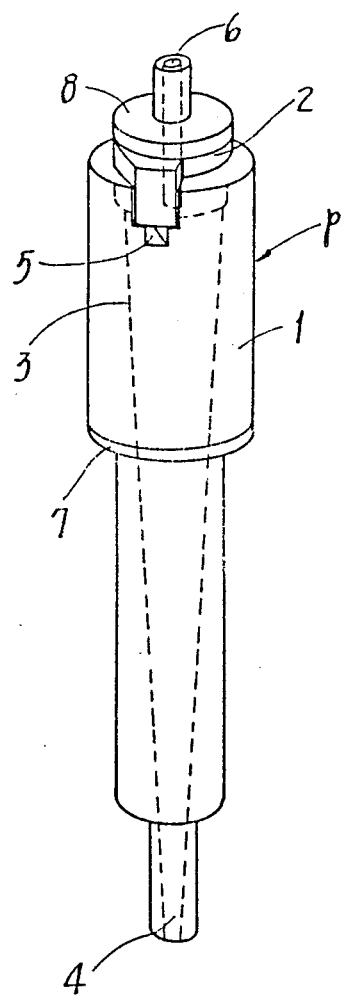
FIG. 1 is a view of an example of a hydrocyclone used in the method of this invention.

The inventors have determined that tamarind seeds should be pulverized to such a particle size that would allow the polysaccharides contained therein to be separated easily from other components. In general, tamarind seeds are flat and rectangular, with a length of about 1–1.5 cm, a width of about 1 cm, and a thickness of about 4 mm. When a tamarind seed is pared, a white bean is obtained which contains the albumen. The polysaccharides are present in the albumen inside cells which are lumped together, each cell having a size of about 40–80 microns. As is characteristic of tamarind seeds, these cells also contain proteins in the form of fine particles having a diameter of 1–2 microns, which account for about 15–24% by weight of the cells. The inventors have determined that the tamarind seeds should be pulverized to form particles of such a small size that all the cell walls are destroyed, to allow easy removal of fine particles of proteins from the cells. The inventors have confirmed that the particles of proteins can be effectively removed if the seeds are pulverized to particles of a size of less than 80 microns, and thereafter treated appropriately.

Furthermore, the inventors have found if an aqueous medium obtained by mixing water with at least one organic solvent compatible with water is used, the polysaccharides can be effectively separated from the tamarind seed powders. When this aqueous medium is used, it is easy to separate the polysaccharides from both the proteins and the fats in the tamarind seed powders, which separation is not possible when either the organic solvent alone or water alone is used. The fats in the seeds are dissolved in the aqueous medium and, therefore, can be easily removed from the powders. As a result, the powders are not tacky and are well dispersed in the medium. Furthermore, the polysaccharides in the seeds are less soluble in this aqueous medium than in water, so that their loss by dissolution in the medium is prevented. Moreover, the polysaccharides are dispersed in the medium in the form of particles of larger size than the particles of proteins. As a result, when the powders are dispersed in the aqueous medium to form a dispersion, which is then allowed to stand still, the polysaccharides can be effectively separated from both the proteins and the fats, because the particles of polysaccharides are larger than the particles of proteins and tend to precipitate more rapidly than the particles of proteins. The polysaccharides thus can be recovered from the bottom layer of the dispersion.

Furthermore, the inventors have found that, in order to recover the polysaccharides from the dispersion, it is convenient to pass the dispersion through a hydrocyclone. A hydrocyclone is used for separating solid particles in a liquid. However, hitherto it has not been used for separating polysaccharides from tamarind seeds. The hydrocyclone has a structure wherein a vessel having a conical inner wall therein is provided with an inlet, an outlet and an overflow exit, the inlet being located at the upper portion of the vessel and being formed so as to introduce a liquid into the vessel in a tangential direction to the conical inner wall,, the outlet being located at the bottom of the vessel, and an overflow exit being located in the center at the top of the vessel. The dispersion is introduced under pressure through the inlet into the vessel. The dispersion advances in a tangential direction to the conical inner wall in the vessel and while flowing down in the vessel under the force of gravity, the dispersion forms a rotating stream which causes the larger particles to move outwardly in the radial direction by the action of centrifugal force and to descend gradually along the inner conical wall until they are discharged from the vessel through the outlet at the bottom of the vessel. Simultaneously, the rotating stream causes the smaller particles to move inwardly in the radial direction and to rise in the vessel. The rotating stream generates a rising stream in the center of the conical wall, and this rising stream carries upwardly the smaller particles until they are discharged from the vessel through the overflow exit. The inventors have found that, when the dispersion obtained from the tamarind seeds is introduced into the hydrocyclone, most of the particles of polysaccharides can be discharged from the outlet located at the bottom of the hydrocyclone, while most of the particles of other ingredients are discharged from the overflow exit located at the top of the hydrocyclone, and therefore, the particles of polysaccharides can be effectively separated from the other ingredients. The present invention has been made on the basis of the findings mentioned above.

The present invention provides a process for separating polysaccharides from tamarind seeds, which process comprises pulverizing the tamarind seeds to form particles having a particle size of less than 80 microns, adding the particles to an aqueous medium containing 5-60% by weight of at least one water soluble organic solvent, stirring and dispersing the particles in the medium, passing the resulting dispersion into a hydrocyclone to cause the dispersion to move under the effect of gravity and centrifugal force, thus classifying the particles in the hydrocyclone according to their sizes and densities, until the polysaccharides are discharged from an outlet situated at the bottom of the hydrocyclone and the other ingredients are discharged from an overflow exit situated at the top of the hydrocyclone, thereby separating the polysaccharides from other ingredients.

In the present invention the method used for pulverizing the tamarind seeds is not particularly limited. Any method can be used, such as a wet method using a colloid mill, a dry method using a hammer mill, or a fluid energy mill and so on. Among these methods, the use of a fluid energy mill is preferred because it can provide particles having a narrow size distribution.

In the present invention it is required that the tamarind seeds be pulverized to particles of less than 80 microns. This arises from the need to separate all the albumen cells into individual cells. Furthermore, the cell walls must be partly destroyed to expose the fine particles of proteins of about 1-2 microns contained in the cells. In order to obtain particles of a size of less than 80 microns, it is preferred to use a sieve of 200-250 meshes ad to collect the particles which pass through the sieve. When this sieve is used, it is possible to remove most of the cellulosic ingredients and other impurities found in the tamarind seeds.

In the present invention it is preferred that the particles obtained by the pulverization have a size of more than 5 microns. The reason for this is that the particles of polysaccharides which are of a size of less than 5 microns, when dispersed in a liquid such as water or an organic solvent, are liable to agglomerate with fine particles of proteins of 1-2 microns, and accordingly are liable to be discharged together with the particles of proteins, resulting in a decrease in the yield of polysaccharides. Usually, however, this problem is not encountered because when the tamarind seeds are pulverized, fine particles of less than 5 microns in size are not formed as long as the pulverization is not carried out for a very long period. If it is found necessary to remove the fine particles of less than 5 microns, this can be done by air classification or by means of a polyamide sieve for ultrafine particles.

In the present invention the fine particles thus obtained must be dispersed in an aqueous medium. An aqueous medium which can be used is a mixture which consists essentially of 5-60% by weight of at least one water soluble organic solvent, the balance being water. As the water soluble organic solvent, lower aliphatic alcohols such as methyl alcohol, ethyl alcohol, propyl alcohol, especially isopropyl alcohol, and ketones such as acetone can be used. A preferred aqueous medium is a mixture consisting of 10-40% by weight of water soluble organic solvent, the balance being water.

´The proportion of water soluble organic solvent in the aqueous medium must be limited to the range of 5–60% by weight for the following reasons. When the amount of the water soluble organic solvent is decreased to less than 5% by weight, the aqueous medium contains a large amount of water and the particles of polysaccharides are liable to become swollen in the aqueous medium, while the fats become less soluble in the aqueous medium. Therefore, it becomes difficult to separate the particles of polysaccharides from the fats in the aqueous medium. When the amount of the water soluble organic solvent is increased to more than 60% by weight in the aqueous medium, the fats are no longer soluble in the aqueous medium, the cell walls are hardened by the aqueous medium, and the water soluble ingredients become less soluble in the aqueous medium. Furthermore, when the amount of the water soluble organic solvent is more than 60%, the fine protein particles are liable to stick to the cell walls so firmly that they cannot be separated into single particles dispersed in the aqueous medium. In contrast, when the aqueous medium contains 5–60% by weight of the water soluble organic solvent, the balance being water, the cell walls can be moderately softened, the polysaccharide particles and fine protein particles in the cell can be well separated and dispersed as single particles, the fats can be dissolved in the aqueous medium, and also other ingredients such as water soluble glucosides, colored materials, and even sources of odor included in the seeds can be dissolved in the aqueous medium, which are all advantageous characteristics.

In the present invention it is required that the fine particles of tamarind seed be added to the aqueous medium to form a dispersion, which is stirred to separate and disperse the particles thoroughly as single particles. A high speed stirrer can be used for stirring. The stirring is usually continued for about 30–60 minutes. During the stirring the temperature is maintained at 10°–35° C.

The resulting dispersion is introduced into a hydrocyclone. An example of a hydrocyclone is illustrated in FIG. 1. The hydrocyclone P in FIG. 1 comprises body 1 and cover 2. Body 1 is a vessel having therein a conical wall surface 3, and cover 2 is placed on the top of the vessel to close the top. Wall surface 3 is a conical surface which is progressively narrowed downwardly and in which opposite sloping lines make an angle of 10°–30°. Body 1 is provided with outlet 4 at the bottom thereof, inlet 5 on the side surface in the upper portion thereof, inlet 5 intersecting body 1 in tangential relation with respect to conical wall surface 3. Cover 2 is provided with overflow exit 6 at an upper portion thereof, and covers the upper portion of body 1 except for inlet 5, which is not covered.

In order to introduce the dispersion into the hydrocyclone, pressure is applied to the dispersion immediately before its introduction into the hydrocyclone, causing the dispersion to flow through inlet 5 into the hydrocyclone in a direction tangential with respect to conical wall surface 3. In order to apply pressure to the dispersion, a pump can be used which is set to give a pressure of 3–4 Kg/cm$^2$. The value of this pressure is the "pressure loss", which is the difference between the feeding pressure and the overflow pressure.

After its introduction into the hydrocyclone, the dispersion advances along wall surface 3 to form a rotating stream, which descends gradually in the hydrocyclone under the action of gravity. In the course of the descent of the rotating stream the particles of polysaccharides, which have a larger density and a larger particle size than the particles of proteins, advance in the vicinity of wall surface 3, and are gathered in the bottom of vessel 1 until they are discharged from outlet 4, while other ingredients such as particles of proteins which have a smaller density and a smaller particle size move away from wall surface 3 and are taken into a rising rotating stream formed in the center of wall surface 3, and discharged from overflow exit 6. Thus, the particles of polysaccharides are separated from the particles of other ingredients such as proteins.

Figure 2:
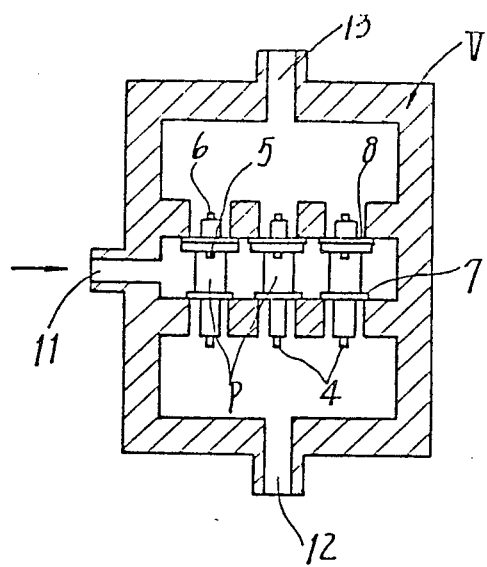
FIG. 2 is a diagram of the arrangement of a plurality of hydrocyclones in parallel to form a container used in an embodiment of the method of this invention.

In general, for separating small particles, the hydrocyclone must have a small volume. Since the particles used in the present invention are of small sizes of less than 80 microns, a hydrocyclone having a small volume must be used. Normally, a suitable hydrocyclone has a diameter of from 10 mm to several tens of mm. Such a small hydrocyclone has a small capacity. Therefore, when the process is carried out on a commercial scale, a number of hydrocyclones P are arranged in parallel as shown in FIG. 2 in a cyclone case or container V, wherein inlets 5, outlets 4 and overflow exits 6 are grouped respectively and each group is mutually separated by packings 7 and 8. In this manner, when the dispersion is introduced through entrance 11 into the container V, the dispersion is conducted into every hydrocyclone P from each inlet 5, and particles of polysaccharides are discharged from each outlet 4, and gathered to be discharged from common port 12. On the other hand, the other ingredients are discharged from common overflow port 13.

Figure 3:
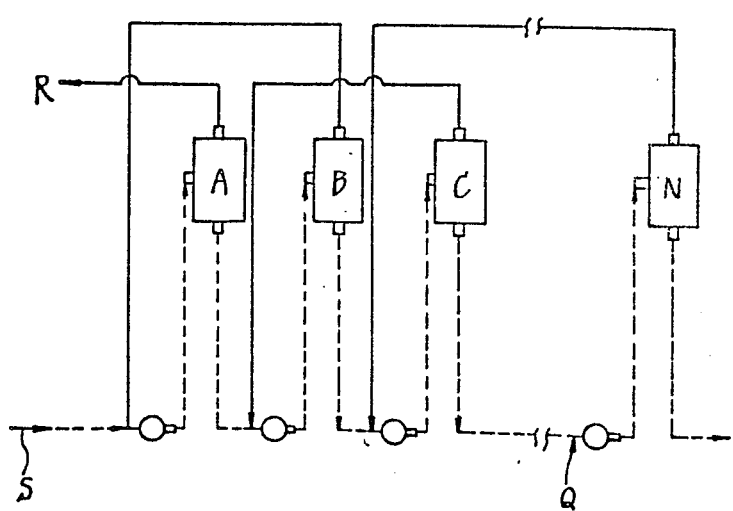
FIG. 3 is a diagram of the arrangement of a plurality of containers in series to form a separation apparatus used in an embodiment of the method of this invention.

Furthermore, when the process is carried out industrially, it is preferred to connect a number of containers V in series, as shown in FIG. 3 to achieve economy of the aqueous medium. In FIG. 3, each of A, B, C, . . . - and N denotes container V, the aqueous medium is first introduced from the position Q into container N, while, the dispersion is first introduced from the position S into container A. Then the dispersion is discharged from the port of container A in a state of being rich in the particles of polysaccharides, then discharged from the port of container B in a state of being even richer in the particles of polysaccharides. After this process has been repeated many times, the dispersion is at last discharged from the port of the last container N in a state of being the richest in the particles of polysaccharides.

On the other hand, the aqueous medium is introduced from position Q and discharged from the overflow port of container N in a state of being rich in the other ingredients. Thereafter, the thus discharged medium is mixed with the dispersion discharged from the preceding container, for example, and mixed with the dispersion discharged from container B and then introduced into container C, wherein the aqueous medium is made richer in the other ingredients and then discharged from the overflow port of container C. After this process has been repeated many times, the aqueous medium is at last discharged in the state of being richest in the other ingredients. Thus the dispersion and the aqueous medium are conducted in mutually opposite directions, and the aqueous medium can be economized.

The resulting dispersion containing a large amount of polysaccharides is then filtered, dewatered and dried to give the product.

The thus obtained product was analyzed. It was found that the product contained less than 3% by weight of proteins, less than 1% of fatty substances, and more than 92% of polysaccharides and hence was of a high grade. The product also had good whiteness of more than 70%, was tasteless, odorless and of very excellent quality.

The method of the present invention, therefore, has considerable advantages in that it provides readily polysaccharides of excellent quality. Prior art methods required troublesome steps for removing fatty substances or proteins, and sometimes required a drying step or repulverizing step for preparing a product of high grade, which made the methods complicated and troublesome. In contrast, the method of the present invention is surprising in that it requires no other steps than pulverizing the tamarind seeds to prepare a dispersion in an aqueous medium and passing the dispersion through a hydrocyclone. The separation of polysaccharides from other ingredients such as proteins and fatty substances to produce polysaccharides of an excellent high grade makes use of the difference in behavior due to the difference in density and particle size between the polysaccharides and the other ingredients in a specific aqueous medium under the action of centrifugal force and gravity. The present invention has the considerable advantages mentioned above.

The present invention is further explained below by way of Examples and Comparative Examples, from which the advantages brought about by the present invention will become apparent.

In the Examples and Comparative Examples, the product obtained was analyzed according to the following methods:

Protein Content: Semi-micro Kjeldahl method according to Food Additive Official Regulation of Japan.

Fat Content: Soxhlet extraction method according to conventional starch chemistry experiment method.

Polysaccharide Content: Anthrone sulfuric acid method according to conventional biochemical experiment method.

Whiteness: Reflectivity measurement (452 nm), with magnesium oxide being considered to have a whiteness of 100, according to conventional method in starch chemistry experiment method.

In all the Examples and Comparative Examples, the results of the analysis of the products are expressed in % by weight.

EXAMPLE 1

The black skins of tamarind seeds were pared and extraneous matters sticking to the surface of the pared seeds were removed until white beans were obtained.

Then, the white beans were pulverized by a hammer mill to give fine particles. The particles were classified by means of a sieve of 250 meshes to obtain fine particles which pass through the sieve. The fine particles had an average particle size of 40 microns, and were distributed in the range of 5–50 microns. The fine particles contained 55% of polysaccharides, 18% of proteins, 6.5% of fats and 7.0% of water. An aqueous medium consisting of 35% by weight of ethyl alcohol and 65% by weight of water was used. 100 Kg of the fine particles were added to 600 Kg of the aqueous medium while being stirred, and the resulting dispersion was further stirred at 30° C. for 1 hour.

The hydrocyclones shown in FIG. 1, which were made of synthetic resin by Doll Oliver Inc., U.S., and had an inner diameter of 10 mm, were used. The hydrocyclones were arranged six in parallel as shown in FIG. 2 and placed in container V. Containers V were further arranged six in series to construct a separating apparatus as shown in FIG. 3, and the apparatus was used for separating the dispersion.

The dispersion was fed into the apparatus from the position indicated by S in FIG. 3 at a rate of 12 liters/min. On the other hand, the aqueous medium was fed into the apparatus from the position indicated by Q at a rate of 12 liters/min. A pressure loss in each container A N was set at 4.0 kg/cm$^2$ (difference between feeding pressure and overflow pressure), and classification was conducted for 1 hour.

The dispersion rich in polysaccharides was taken out from the port of the sixth container N and dewatered by a centrifugal machine to form a cake, which was dried and pulverized into a product. 53.2 kg of the product were obtained.

The product was analyzed and was found to contain 2.96% of proteins, 0.5% of fatty substances, and 94.9% of polysaccharides, and was tasteless, odorless and of a high grade whiteness.

EXAMPLE 2

The black skins of tamarind seeds were pared and extraneous matters sticking to the pared seeds were removed until white beans were obtained. Then, the white beans were pulverized by means of a fluid energy mill. The resulting matter was classified by means of a sieve of 200 meshes to obtain fine particles which pass through the sieve. The fine particles had an average particle size of 50 microns and were distributed in the range of 5–60 microns. The fine particles included 55% of polysaccharides, 18% of proteins, 6.5% of fats and 6.0% of water.

An aqueous medium consisting of 40% by weight of isopropyl alcohol and 60% by weight of water was used. 100 Kg of the fine particles were added to 650 Kg of the aqueous medium while being stirred by a high speed stirrer, and the resulting mixture was further stirred at 30° C. for 1 hour to obtain a dispersion.

The same separating apparatus as in Example 1 was used. With the pressure loss set at 3.5 Kg/cm$^2$, the dispersion was fed into the apparatus from the position indicated by S in FIG. 3 at a rate of 12 liters/min., while the aqueous medium was fed into the apparatus from the position indicated by Q at a rate of 12 liters/min., and thus the apparatus was operated for 1 hour to classify the dispersion.

A dispersion rich in polysaccharides was taken out from the port of the sixth container N and dewatered by means of a centrifugal machine to form a cake, which was dried and pulverized into a product. The product weighed 53.7 Kg. The product had a protein content of 2.94%, a fat content of 0.5% and a polysaccharide content of 94.8%. The product was tasteless, odorless, and of a high grade whiteness.

EXAMPLE 3

Fine particles were prepared by a fluid energy mill as n Example 2. 100 Kg of the fine particles were charged into a vessel containing 500 Kg of an aqueous medium while being stirred by a high speed stirrer. The aqueous medium consisted of 20% by weight of ethyl alcohol and 80% by weight of water. Thereafter, stirring was further continued for 1 hour to form a dispersion.

Hydrocyclones made of synthetic resin by Doll Oliver Inc., U.S., and having an inner diameter of 15 mm were used. Six hydrocyclones were arranged in parallel and were placed in a container to form container V.

Twelve containers V were arranged in series to form a separating apparatus.

The dispersion was fed into the apparatus from the position indicated by S in FIG. 3 at the rate of 12 liters/min. On the other hand, the aqueous medium was fed into the apparatus from the position Q at the rate of 12 liters/min., and the pressure loss was set at 4.0 Kg/cm$^2$. Classification was thus conducted for about 40 minutes to separate the polysaccharides.

A dispersion rich in polysaccharides was taken out from the port of the twelfth container N and dewatered by means of a centrifugal machine to form a cake, which was dried and pulverized to give a product. The product weighed 52.1 kg, and had a protein content of 2.79%, fat content of 0.6%, and polysaccharide content of 94.8%. The product was tasteless, odorless and of a high grade whiteness.

EXAMPLE 4

Fine particles of tamarind seeds pulverized by a fluid energy mill in the same manner as in Example 2 were used. An aqueous medium consisting of 10% by weight of methylethylketone and 90% by weight of water was used. 100 Kg of the fine particles were charged into a vessel containing 500 Kg of the aqueous medium while being stirred by a high speed stirrer, and stirring was further continued for 1 hour to obtain a dispersion.

A separating apparatus constructed by arranging six hydrocyclones in parallel to form a container V, and further by arranging twelve containers V in series was used. The hydrocyclones were the same as the ones used in Example 1, which were made of synthetic resin and had an inner diameter of 10 mm.

The dispersion was fed into the apparatus from the position indicated by S in FIG. 3 at a rate of 12 liters/min. On the other hand, the aqueous medium was fed into the apparatus from the position indicated by Q at a rate of 12 liters/min., while the pressure loss was set at 4.0 Kg/cm$^2$. A classification was thus conducted for about 40 minutes.

A dispersion rich in polysaccharides was taken out from the port of the twelfth container N and dewatered by means of a centrifugal machine to form a cake, which was dried and pulverized to give a product. The product weighed 51.2 Kg, and had a protein content of 2.68%, a fat content of 0.8% and a polysaccharide content of 94.9%. The product was tasteless, odorless and of a high grade whiteness.

EXAMPLE 5

Fine particles prepared by a fluid energy mill in the same manner as in Example 2 were used. 100 Kg of the particles were charged into a vessel containing 600 Kg of an aqueous medium consisting of 40% by weight of acetone and 60% by weight of water, while being stirred by a high speed stirrer. Stirring was then continued for 1 hour to obtain a dispersion.

A separating apparatus constructed by arranging six hydrocyclones in parallel to form container V, and further by arranging eight containers V in series was used. The hydrocyclones were the same as the ones used in Example 1, which were made of synthetic resin and had an inner diameter of 10 mm.

The dispersion was fed into the apparatus from the position indicated by S in FIG. 3 at a rate of 12 liters/min.. On the other hand, the aqueous medium was fed into the apparatus from the position indicated by Q at a rate of 12 liters/min., while the pressure loss was set at 3.5 Kg/cm$^2$. Classification was thus conducted for about 60 minutes to separate the polysaccharides.

A dispersion rich in polysaccharides was taken out from the port of the eighth container N and dewatered by means of a centrifugal machine to form a cake, which as then dried and pulverized to give a product. The product weighed 52.8 Kg, and had a protein content of 2.98%, fat content of 0.4% and polysaccharide content of 94.7%. The product was tasteless, odorless, of a high grade whiteness and of an excellent quality.

EXAMPLE 6

White beans were obtained by paring away the black skins from tamarind seeds, then were pulverized by a crusher to give coarse particles. 105 Kg of the coarse particles were fed into a colloid mill together with 200 Kg of an aqueous solution consisting of 35% by weight of ethyl alcohol and 65% by weight of water. Wet grinding was thus carried out to give a slurry. The slurry was observed under a microscope, and it was confirmed that the particles in the slurry had an average particle size of 60 microns and that almost all the cell walls were destroyed. The slurry was poured into a vessel, to which were further added 400 Kg of the same aqueous medium, and the resulting slurry was then stirred for about one hour to obtain a dispersion.

The same hydrocyclones as in Example 1, made of synthetic resin and having an inner diameter of 10 mm, were used. The hydrocyclones were arranged six in parallel to form container V, and six containers V were further arranged in series to form a separating apparatus, which was used for separating the dispersion.

The dispersion was fed into the apparatus from the position indicated by S in FIG. 3 at a rate of 12 liters/min.. On the other hand, the aqueous medium was fed into the apparatus from the position indicated by Q at a rate of 12 liters/min., while the pressure loss was set at 3.0 Kg/cm$^2$. Classification was thus carried out for about 1 hour.

The dispersion rich in polysaccharides was taken out from the port of the sixth container N, and dewatered by means of a centrifugal machine to form a cake, which was then dried and pulverized to give a product. The product weighed 50.2 Kg, and had a protein content of 2.38%, fat content of 0.4% and polysaccharide content of 95.4%. The product was tasteless, odorless, of a high grade whiteness and of an excellent quality.

COMPARATIVE EXAMPLE 1

In this comparative example, classification was carried out in almost the same manner as in Example 2, except that no water soluble organic solvent was used, but water alone was used. The particulars of this comparative example are described below.

Fine particles pulverized by means of the fluid energy mill as in Example 2 were used. 100 Kg of the fine particles were placed in a vessel containing 600 Kg of water and then stirred by a high speed stirrer at 30° C. for 1 hour to prepare a dispersion.

The same separating apparatus as in Example 2 was used. Into the separating apparatus the dispersion was fed from the position indicated by S, in the same manner as in Example 2 at a rate of 12 liters/min.. On the other hand, water was fed into the apparatus from the position indicated by Q at a rate of 12 liters/min., while the pressure loss was set at 3.5 Kg/cm$^2$ to initiate the classification process. However, the hydrocyclones became blocked by the dispersion and the classification could not be carried out.

COMPARATIVE EXAMPLE 2

In this comparative example, the amount of water soluble organic solvent was reduced to be outside the range required in the present invention, and classification was conducted by means of the hydrocyclones. The details of the process are described below.

Using the same fine particles pulverized by the fluid energy mill as in Example 2, 100 Kg of the fine particles were charged into a vessel, which contained 600 Kg of an aqueous medium consisting of 3% by weight of isopropyl alcohol and 97% by weight of water, while being stirred by a high speed stirrer. Stirring was further continued at 30° C. for one hour to form a dispersion.

Using the same hydrocyclones as in Example 3, which had an inner diameter of 15 mm, a separating apparatus was constructed by arranging six hydrocyclones in parallel to form a container V, and further by arranging eight containers V in series.

Into the separating apparatus the dispersion was fed from the position indicated by S in FIG. 3 at a rate of 12 liters/min.. On the other hand, the aqueous medium was fed into the apparatus from the position indicated by Q at the rate of 12 liters/min., while the pressure loss was set at 3.5 Kg/cm$^2$. Classification was thus carried out for 50 minutes.

The dispersion rich in polysaccharides was taken out from the port of the 12th container N and dewatered by means of a centrifugal machine to form a cake, which was then dried and pulverized to give a product. The product weighed 55.2 Kg, and had a protein content of 9.2%, fat content of 0.6% and polysaccharide content of 88.9%. The product contained a high amount of proteins and, therefore, its quality was not good.

The results of all the Examples and Comparative Examples are listed in Table 1. From Table 1, it is clear that by the method of the present invention a product of an excellent quality can be obtained, which has a protein content of less than 3% by weight, a fat content of less than 1% by weight, and a polysaccharide content of more than 92% by weight, and a high grade whiteness.

TABLE 1

|  | Solvent (%) | Yield (Kg) | (%) | Polysaccharide Content (%) | Protein Content (%) | Fat Content (%) | Whiteness (%) |
| --- | --- | --- | --- | --- | --- | --- | --- |
| Raw Material Particles | — | — | — | 55.0 | 18.0 | 6.5 | 58 |
| Example |  |  |  |  |  |  |  |
| 1 | 35 | 53.7 | 53.7 | 94.8 | 2.94 | 0.6 | 74 |
| 2 | 40 | 53.7 | 53.7 | 94.4 | 2.99 | 0.5 | 75 |
| 3 | 20 | 52.1 | 52.1 | 94.8 | 2.79 | 0.6 | 74 |
| 4 | 10 | 51.2 | 51.2 | 94.9 | 2.68 | 0.8 | 72 |
| 5 | 40 | 52.8 | 52.8 | 94.7 | 2.98 | 0.4 | 76 |
| 6 | 35 | 50.2 | 50.2 | 95.4 | 2.38 | 0.4 | 76 |
| Comparative Example |  |  |  |  |  |  |  |
| 1 | 0 | — | — | — | — | — | — |
| 2 | 3 | — | — | — | — | — | — |
| 3 | 80 | 55.1 | 55.1 | 88.9 | 9.2 | 0.6 | 74 | from the position indicated by S in FIG. 3 at a rate of 12 liters/min.. On the other hand, the aqueous solution was fed into the apparatus from the position indicated by Q at a rate of 12 liters/min., while the pressure loss was set at 3.5 Kg cm$^2$. Classification was thus carried out. However, after 10 minutes of classification, the apparatus was blocked by the dispersion and the classification could not be continued.

COMPARATIVE EXAMPLE 3

In this comparative example, the amount of water soluble organic solvent was increased to be outside the range required in the present invention, and classification was conducted by means of the hydrocyclones. The details of the process are described below.

Using the same fine particles pulverized by the fluid energy mill as in Example 2, 100 Kg of the fine particles were charged into a vessel containing 500 Kg of an aqueous medium consisting of 80% by weight of isopropyl alcohol and 20% by weight of water, while being stirred by a high speed stirrer. Stirring was then continued at 30° C. for 1 hour to obtain a dispersion.

A separating apparatus constructed by arranging six hydrocyclones in parallel to form container V, and further by arranging twelve containers V in series was used. Each of the hydrocyclones had an inner diameter of 10 mm and was made of synthetic resin.

We claim:
1. A process for recovering from tamarind seeds a dispersion which is rich in particles rich in polysaccharides, said process consisting essentially of the steps of:
   (1) pulverizing tamarind seeds to form particles of less than 80 microns in size;
   (2) remove from the obtained particles those particles which have a size of less than 5 microns;
   (3) dispersing the remaining particles in an aqueous medium consisting essentially of water and 5–60% by weight of at least one water soluble organic solvent to form a dispersion which contains particles rich in polysaccharides and particles rich in other components of the tamarind seeds, said particles rich in polysaccharides being larger than said particles rich in other components;
   (4) classifying said dispersion in at least one hydrocyclone, whereby the particles rich in polysaccharides descend to the bottom of the hydrocyclone and the particles rich in other components rise to the top of the hydrocyclone; and
   (5) withdrawing from the bottom of the hydrocyclone a dispersion which is rich in the particles rich in polysaccharides, and withdrawing from the top of the hydrocyclone a dispersion which is rich in the particles rich in other components.

2. A process as in claim 1, wherein the water soluble organic solvent is selected from the group consisting of lower aliphatic alcohols and ketones.

3. A process as in claim 1, wherein said step of classifying the dispersion of particles is conducted in at least two hydrocyclones arranged in parallel in a container which is provided with an entrance for the dispersion of particles to be classified, a common overflow port through which the dispersion which is rich in particles rich in other components is withdrawn, and a common port through which the dispersion which is rich in particles rich in polysaccharides is withdrawn.

4. A process as in claim 1, wherein at least two said containers are arranged in series, and the dispersion of particles to be classified is introduced into the first container in the series, and the aqueous medium is introduced into the last container in the series, and the dispersion and the aqueous medium are progressively conducted in opposite directions in the series.

5. A process for recovering from tamarind seeds a dispersions which is rich in particles rich in polysaccharides, said process consisting essentially of the steps of:
   (1) pulverizing tamarind seeds to form particles of less than 80 microns in size but not less than 5 microns in size;
   (2) dispersing the obtained particles in an aqueous medium consisting essentially of water and 5–60% by weight of at least one water soluble organic solvent to form a dispersion which contains particles rich in polysaccharides and particles rich in other components of the tamarind seeds, said particles rich in polysaccharides being larger than said particles rich in other components;
   (3) classifying said dispersion in at least one hydrocyclone, whereby the particles rich in polysaccharides descend to the bottom of the hydrocyclone and the particles rich in other components rise to the top of the hydrocyclone; and
   (4) withdrawing from the bottom of the hydrocyclone a dispersion which is rich in the particles rich in polysaccharides, and withdrawing from the top of the hydrocyclone a dispersion which is rich in the particles rich in other components.

6. A process as in claim 5, wherein the water soluble organic solvent is selected from the group consisting of lower aliphatic alcohols and ketones.

7. A process as in claim 5, wherein said step of classifying the dispersion of particles is conducted in at least two hydrocyclones arranged in parallel in a container which is provided with an entrance for the dispersion of particles to be classified, a common overflow port through which the dispersion which is rich in particles rich in other components is withdrawn, and a common port through which the dispersion which is rich in particles rich in polysaccharides is withdrawn.

8. A process as in claim 5, wherein at least two said containers are arranged in series, and the dispersion of particles to be classified is introduced into the first container in the series, and the aqueous medium is introduced into the last container in the series, and the dispersion and the aqueous medium are progressively conducted in opposite directions in the series.

* * * * *